United States Patent Office 2,944,990
Patented July 12, 1960

2,944,990
DRIED RUBBER LATEX SHEETING AND PROCESS FOR PREPARING SAME

David McCall, Sennett Estate, Singapore, assignor to Mac & Lai Company (Malaya) Limited, a company of the Colony of Singapore and Federation of Malaya No Drawing. Filed Nov. 4, 1957, Ser. No. 694,101
Claims priority, application Great Britain June 26, 1957

4 Claims. (Cl. 260—3)

This invention relates to the preparation of latex rubber to produce sheet rubber.

In a known process for the preparation of latex rubber, the latex is diluted with water, and a coagulant, generally consisting of a dilute aqueous solution of an organic or mineral acid, is then thoroughly stirred into the latex-water mixture, the coagulant preferably being added in an amount such that a coagulum is formed after a period of some 30 to 40 minutes. Any resulting froth is skimmed off, and the coagulum is passed between rollers to form sheets, which are then immersed for 24 hours in water to remove the serum and water soluble impurities, the sheets being subsequently dried in a smoke house at a temperature of 120° F. for a period of from 5 to 8 days.

According to one aspect of the present invention there is provided a process for the preparation of latex rubber, comprising the steps of diluting raw latex rubber, adding to the latex a coagulant in an amount sufficient to produce coagulation of the latex, and an additive which essentially comprises paranitrophenol, formic acid, oxalic acid, and formaldehyde, allowing a coagulum to form, and preparing sheets from the coagulum, said additive being added in an amount such that for every 1,280 parts by weight of resulting dried sheet there are from 1 to 3 parts by weight of paranitrophenol, from 6 to 20 parts by weight of formic acid, from 0.0352 to 0.352 parts by weight of oxalic acid, and from 1 to 12 parts by weight of formaldehyde solution.

According to another aspect of the present invention there is provided an additive for use in the preparation of dried latex rubber sheet, comprising paranitrophenol, formic acid, oxalic acid and formaldehyde, the constituents being in the proportion of from 1 to 3 parts paranitrophenol, from 6 to 20 parts formic acid, from 0.0352 to 0.352 parts of oxalic acid and from 1 to 12 parts by weight formaldehyde solution for every 1,280 parts by weight of dried sheet to be prepared.

For a better understanding of the invention and to show how the same may be carried into effect, some examples will now be given.

EXAMPLE 1

An additive for use in the preparation of latex rubber was prepared by dissolving ½ ounce of paranitrophenol in 3 ounces of concentrated formic acid to form a solution to which was added 0.044 ounce (1.25 grams) oxalic acid dissolved in 1 ounce of formaldehyde solution. About 20½ ounces of dilution water was added to the resulting mixture to make the total equal to 25 ounces.

EXAMPLE 2

An additive for use in the preparation of latex rubber was prepared by dissolving 1¼ ounces of paranitrophenol in 7½ ounces of concentrated formic acid to form a solution to which was added 0.11 ounces (3.125 grams) oxalic acid dissolved in 2½ ounces of formaldehyde solution. About 13¾ ounces of dilution water was added to the resulting mixture to make the total equal to 25 ounces.

EXAMPLE 3

In an example of the use of the additive prepared in accordance with Example 1 or Example 2, there was employed sufficient raw latex to result in the production of a sheet of dried rubber weighing 2 lbs. The raw latex was diluted with water until the mixture had a rubber content of approximately 66⅔%, and sufficient dilute formic acid was added to the latex-water mixture to coagulate the latex in from 30 to 40 minutes.

2½ ounces of the additive of Example 1, or 1 ounce of the additive of Example 2 were added to the latex-water mixture, these amounts of additive being such as to result in the same proportion of the constituents of the additive being added to the latex-water mixture, and the mixture was thoroughly stirred. The froth which rose to the top of the mixture was skimmed off, and a coagulum was formed after a period of from 30 to 40 minutes. The coagulum was removed, and passed, together with water, between a pair of rollers, one of which was plain and the other of which was ribbed, so as to wash the coagulum, and to form a sheet of latex of ⅛ inch thickness. The sheet was then dipped in water to rinse it, and was taken to a drying shed where it was left to dry for a period of from 4 to 6 days at the normal atmospheric temperature for the tropical country in which the process of this example was performed. After drying, the sheets of rubber latex prepared by the process were ready for use in the same manner as smoked sheets prepared by the known process indicated above.

The following three tables give the properties of sheets prepared by the present process compared with control sheets prepared by the known process indicated above.

*Table 1*

Chemical analysis (an average of three samples tested)

| | Nitrogen Content, percent wt. | Ash Content, percent wt. | Acetone Extract, percent wt. | Copper Content, p.p.m. | Manganese Content, p.p.m. |
|---|---|---|---|---|---|
| Sheet produced by process of present invention. | 0.41 | 0.22 | 3.00 | 1.4 | 1.0. |
| Control Sheet | 0.35 to 0.56. | 0.12 to 0.33. | 2.70 to 3.68. | 1.–2. | 0.40 to 1.30. |

*Table 2*
MOULD TEST

| Day of observation | 1st | 2nd | 4th | 5th | 6th | Period within which mould developed fully |
|---|---|---|---|---|---|---|
| Sheet produced by process of present invention. | Nil. | Nil. | Nil. | Nil. | Nil. | No mould growth observed after 7 days. |
| Control Sheet | Nil. | Nil. | Nil. | One mould spot. | Many mould spots. | 6 days. |

Table 3
TECHNOLOGICAL TESTS—WILLIAMS PLASTICITY

| | Mooney Viscosity | Normal | | Aged 24 hrs. in an oven at 100° C. | | TCStrain Normal percent Elongation | Technical Classification |
|---|---|---|---|---|---|---|---|
| | | D10 mm. | Rec. mm. | D10 mm. | Rec. mm. | | |
| Sheet produced by process of present invention | 87½ | 3.88 | 5.18 | 3.73 | 6.27 | 80.5 | Yellow Circle |
| Control Sheet | 72 | 4.19 | 5.33 | 3.97 | 5.05 | 60–89.88 | Do |

It will be seen from Table 1 that the nitrogen and ash contents are normal, and the copper and manganese contents are below the permitted A.S.T.M. maximum, the samples all meeting the normal rubber packing specifications. Also, the acetone extracts lie in the normal range for sheet rubber.

The tables show that the sheets produced by the process of the present invention are comparable with those produced by the known process, and, in fact, the sheets produced by the process of the present invention have a greater mould resistance than the known sheets.

The additive, which is added to the latex-water mixture, comprises four components, namely paranitrophenol, formic acid, oxalic acid, and formaldehyde. In general, the mixture of these four constituents is diluted with water, so that the amount of additive added to the latex-water mixture will depend upon the degree of dilution of the additive. The proportions of the constituents of the additive may vary within certain limits, the proportions being based on the weight of resulting dried rubber sheet, and for every 1,280 parts by weight of resulting dried sheet the amount of additive employed should contain from 1 to 3 parts by weight of paranitrophenol, from 6 to 20 parts by weight of formic acid, from 0.0352 to 0.352 parts by weight of oxalic acid and from 1 to 12 parts by weight of formaldehyde solution. Thus, for example, where a 2 lb. sheet of rubber latex is to be prepared, the amount of additive employed should contain between 1/40th and 3/40th ounce of paranitrophenol, between 3/20th and ½ ounce of formic acid, between 0.00088 ounce (1/40th gram) and 0.0088 ounce (¼ gram) oxalic acid and between 1/40 and 3/10th ounce of formaldehyde solution.

The additive serves to prevent fungus growth, and to dehydrate the resulting sheets, so that it is unnecessary to dry the sheets in a smoke house as was previously the practice, it being necessary only to hang the sheets to dry in a shed for a period of from 4 to 6 days at tropical atmospheric temperature. The tropical atmospheric temperature may vary from as little as 72° F. to as much as 98° F. or more, depending upon the season of the year, but, in general, the atmospheric temperature will vary from about 85° F. to 90° F. during that part of the year when the rubber is tapped, and the process of the present invention will be employed.

In Example 3, formic acid was used as the coagulant, but it will be appreciated that other coagulants, such as, for example, acetic acid may be used, the particular coagulants employed depending to some extent on the nature and origin of the latex.

The concentrated formic acid employed in the Examples was that which is sold commercially in the Federation of Malaya for use as a coagulant, the formic acid being diluted with water before it is used as a coagulant, and the formaldehyde solution is the normal formaldehyde solution of commerce and contains 37%–40% formaldehyde.

I claim:

1. A process for the preparation of dried latex rubber sheeting, comprising the steps of diluting with water raw rubber latex, adding to the diluted latex a coagulant, in an amount sufficient to produce coagulation of the latex, and an additive which essentially comprises paranitrophenol, formic acid, oxalic acid, and formaldehyde, allowing a coagulum to form, preparing sheeting from the resulting coagulum, and thereafter allowing the resulting sheeting to dry in the absence of wood smoke to produce sheeting having the appearance of smoked sheeting and the qualities of natural rubber, said additive being added in an amount such that for every 1,280 parts by weight of resulting dried sheeting there are from 1 to 3 parts by weight of paranitrophenol, from 6 to 20 parts by weight of formic acid, from 0.0352 to 0.352 parts by weight of oxalic acid, and from 1 to 12 parts by weight of formaldehyde solution.

2. A process according to claim 1, wherein the coagulum is washed with water while it is being formed into sheeting and the resulting sheeting is allowed to dry at tropical atmospheric temperature for a period of from 4 to 6 days.

3. A process according to claim 1, wherein the coagulant is formic acid, which is added in an amount sufficient to produce coagulation of the latex in from 30 to 40 minutes.

4. Dried latex rubber sheeting having the appearance of smoked sheeting when prepared by the process of claim 1.

References Cited in the file of this patent
UNITED STATES PATENTS

| | | |
|---|---|---|
| 1,619,938 | Jury et al. | Mar. 8, 1927 |
| 1,846,164 | Twiss et al. | Feb. 23, 1932 |

FOREIGN PATENTS

| | | |
|---|---|---|
| 726,181 | Great Britain | Mar. 16, 1956 |

OTHER REFERENCES

Marchionna: "Latex," volume 1, (1933), The Rubber Age Publishing Company, New York, pages 114, and 254.